W. YATES.
GOVERNOR FOR STEAM-ENGINES.
No. 174,888. Patented March 14, 1876.
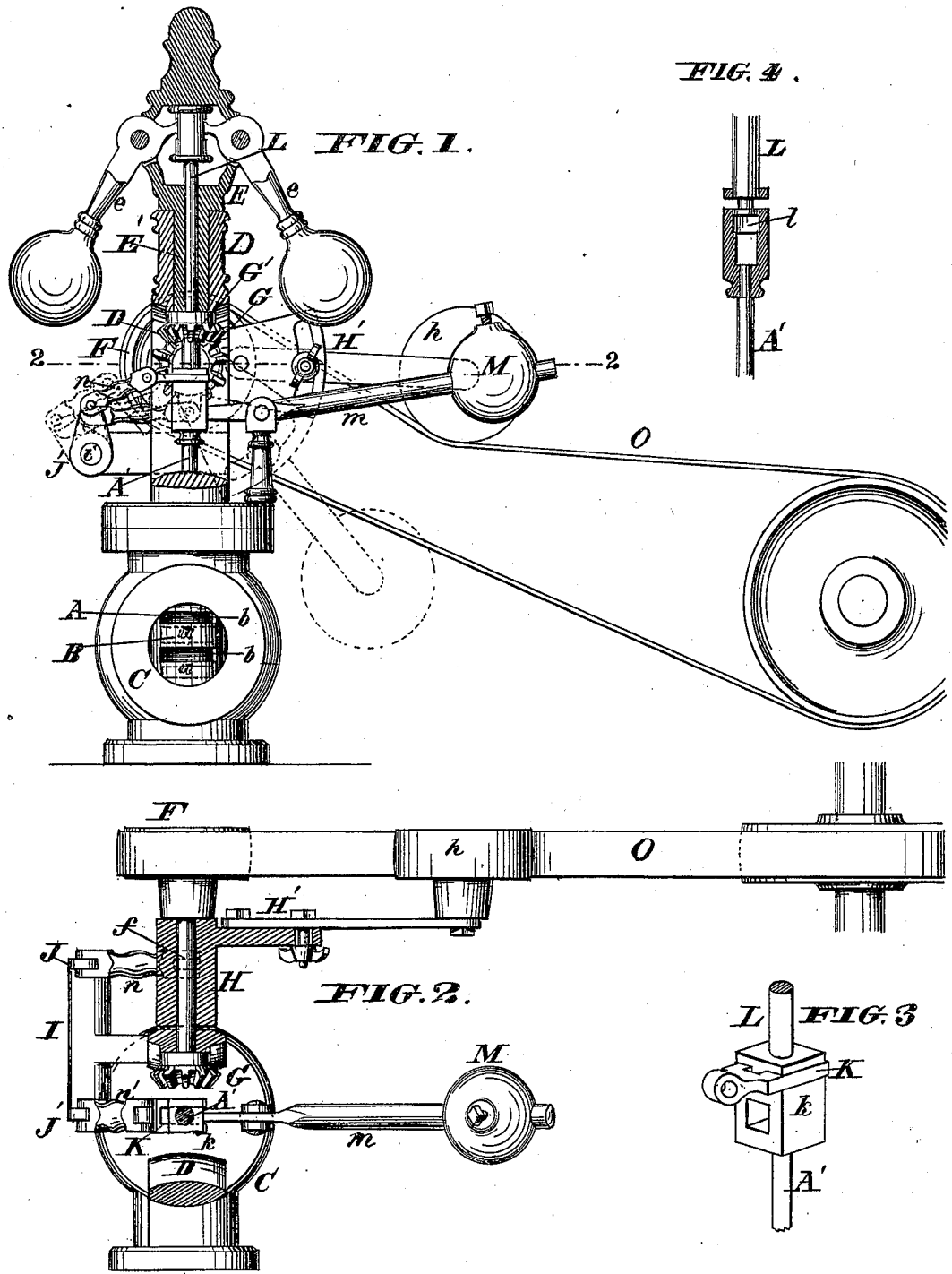

UNITED STATES PATENT OFFICE.

WILLIAM YATES, OF LONDON, CANADA.

IMPROVEMENT IN GOVERNORS FOR STEAM-ENGINES.

Specification forming part of Letters Patent No. 174,888, dated March 14, 1876; application filed January 12, 1876.

*To all whom it may concern:*

Be it known that I, WILLIAM YATES, of London, in the county of Middlesex and Province of Ontario, Canada, have invented a new and useful Improvement in Governors for Steam-Engines, of which the following is a specification:

My invention consists in combining with a steam-engine or other governor an arm bearing on the driving-belt, and so attached to a coupling, connecting two parts of the valve-rod, that, in the event of the breaking or uncoupling of the belt, the throttle-valve will be automatically disconnected from the governor and instantaneously closed by the action of a weight or spring. The arm which thus controls the valve-rod coupling serves the purpose, also, of a belt-tightener.

In the accompanying drawing, Figure 1 is an elevation of a governor and its accessories, with my invention applied. Fig. 2 is a horizontal section of the same on the line 2 2, Fig. 1. Fig. 3 is a perspective view of a detached portion. Fig. 4 is a sectional elevation of the coupling of a compound valve-rod.

A represents a slide-valve, attached to a spindle, A', and having ports *a a*. B is a valve-chamber, provided with ports *b b*, corresponding with those of the valve. C is the ordinary steam-chamber. D is the arch of the governor, forming a bearing for head E, carrying the ball-arms *e e*. F is the driving-pulley, the shaft *f* of which carries a bevel-pinion, G, gearing with a bevel-pinion, G', on the sleeve E', which turns within the arch D and communicates rotation to the head and balls, in the usual way. H is a sleeve, fitted upon a horizontal arm on the arch D, and carrying an adjustable arm, H', and an idler-pulley, *h*, running on the driving-belt O, and serving the purposes of a belt-tightener, as well as for operating the safety attachment. I is a box, bolted on the side of the arch D. Through this box runs a shaft, *i*, to which are keyed two crank-arms, J J'. K is a steel fork, connected to the arm J', and fitting into slots in the block *k*, on the end of the valve-spindle A'. L is the spindle, acted upon by the toes of the arms *e e*. The lower end of the spindle has a groove turned to correspond with the slots in the block *k*.

The steel fork K constitutes the connection between the spindles A and L, and, if withdrawn, immediately allows the valve-spindle, by the action of the weight and lever M *m*, or by a suitable spring employed for the same purpose, to rise through the space *l*, which is sufficient to shut off the steam on the under side of the valve-port and upper side of the chamber, and thus shut off all connection between the boiler and engine.

The operation is as follows: The belt is the means by which the fork K is kept in position, and the idler, resting upon the belt, operates the shaft *i* by connecting the sleeve H and crank J on one end, and crank J' and steel fork K on the other, which connection is made by the rods *n n'*. Should the belt break or slip off, the idler immediately falls, forcing back the fork, which destroys the connection between the spindle A' and L, operating the valve as stated above.

The device is applicable to valves of any form.

The invention may be applied to a vertical engine by the use of a supplemental horizontal weight-arm, or a spring, to act on a vertical arm carrying the idler-pulley, in such a manner as to press the latter against the belt.

My invention possesses great utility as a belt-tightener. It obviates the frequent necessity of relacing or cutting the belt, and keeps the belt constantly taut and effective, so as to avoid the difficulty commonly experienced, especially with pulleys of small size, by the slipping of the belt and the running of the governor-arms in advance of the engine-shaft, and the consequent partial closure of the valve when the motion of the engine is checked by a sudden load.

Having thus described my invention, the following is what I claim as new and desire to secure by Letters Patent:

1. The divided or two-part valve-rod A' L, connected by a clutch or key, K, under control of tripping mechanism bearing on the driving-belt, substantially as herein set forth.

2. The combination of the stem L A', yoke

K, rocking crank-shaft $i$ J J', connecting-rods $n$ $n'$, sleeve H, adjustable arm H', and idle pulley $h$ with the driving-belt O, governor E $e$, and customary connections F $f$ G G' E', substantially as and for the purposes set forth.

3. The combination of the counter-weight M and arm $m$, or a spring in lieu thereof, with the divided valve rod A' L, connecting-fork or clutch K, slide-valve A, and chamber B $b$, as and for the purposes specified.

WILLIAM YATES.

Witnesses:
OCTAVIUS KNIGHT,
WALTER ALLEN.